(12) United States Patent
Watanabe et al.

(10) Patent No.: US 6,652,960 B1
(45) Date of Patent: Nov. 25, 2003

(54) PLASTIC-COATED METAL PLATE

(75) Inventors: Tadashi Watanabe, Hiratsuka (JP);
Tadayoshi Hiraki, Odawara (JP);
Akira Tominaga, Chigasaki (JP);
Takeshi Yawata, Hiratsuka (JP)

(73) Assignee: Kansai Paint Co., Ltd., Hyogo-ken (JP)

( * ) Notice: Subject to any disclaimer, the term of this patent is extended or adjusted under 35 U.S.C. 154(b) by 0 days.

(21) Appl. No.: 09/708,410

(22) Filed: Nov. 9, 2000

(30) Foreign Application Priority Data

Nov. 9, 1999 (JP) ............................................. 11-318220

(51) Int. Cl.⁷ ................................................. B32B 5/16
(52) U.S. Cl. ...................... 428/332; 428/413; 428/418; 428/423.1; 428/458; 180/89.1; 180/156; 180/325; 180/330; 180/331.7
(58) Field of Search ................................. 428/413, 418, 428/423.1, 458, 332; 180/89.1; 156/325, 330, 331.7

(56) References Cited

U.S. PATENT DOCUMENTS 4,500,604 A * 2/1985 Herold et al. ................ 428/414
6,132,864 A * 10/2000 Kiriazis et al. ............. 428/337
6,565,966 B2 * 5/2003 Hiraki et al. ................ 428/332

FOREIGN PATENT DOCUMENTS

GB 2117382 * 10/1983

* cited by examiner

*Primary Examiner*—Leszek Kiliman
(74) *Attorney, Agent, or Firm*—Wenderoth, Lind & Ponack, L.L.P.

(57) ABSTRACT

The present invention provides a plastic-coated metal plate prepared by sticking a plastic layer on one face or both faces of a metal plate via a coating film of a thermosetting adhesive comprising an amine-added epoxy resin (A) and a polyisocyanate compound (B), which is excellent in a corrosion resistance, an adhesive property and a finishing property and which is particularly useful for forming a car body.

17 Claims, No Drawings

PLASTIC-COATED METAL PLATE

The present invention relates to a plastic-coated metal plate prepared by sticking a plastic film at least on one face of a metal plate via a coating film of a thermosetting adhesive comprising an amine-added epoxy resin and a polyisocyanate compound, which is excellent in a corrosion resistance, an adhesive property and a finishing property and which is particularly useful for forming a car body.

A laminating technique for elevating a durability and a dressing property by coating a plastic film or a coating film on a surface of a base material such as a steel plate via an adhesive has so far been put to practical use in various fields, and the adhesives used for this technique is always required to be improved. The reason therefor is that an intrinsic function of an adhesive is to adhere a film and a coating film on a base material face but in addition thereto, functions to prevent rusts from being produced under corrosive environment and inhibit lift and blister on film and coating film faces from being caused are very important as well.

A lot of trials to add rust preventive pigments to adhesives have been proposed as solving means therefor (for example, Japanese Patent Application Laid-Open No. 61456/1980, Japanese Patent Application Laid-Open No. 58859/1981, Japanese Patent Application Laid-Open No. 171949/1983, Japanese Patent Application Laid-Open No. 14941/1984 and Japanese Patent Application Laid-Open No. 14943/1984).

Addition of a rust preventive pigment to an adhesive elevates the corrosion resistance but provides the defects that the adhesive property with a film is reduced and it becomes difficult to well balance the corrosion resistance with the adhesive property. Accordingly, the poor adhesive property is sometimes brought about, and peeling and lifting on a film face and a blistering phenomenon by blister are caused during use over a long period of time. Further, involved are the problems that since a temperature of about 190° C. or higher is required as a hot pressing condition of a laminate film in conventional techniques, the facilities become large-scaled, and energy consumption becomes excessive and that a residual stress of an adhesive grows large and peeling in an adhesion interface is liable to proceed with the passage of time.

In order to avoid these problems, proposed is a method in which an undercoating material containing a specific resin component containing a rust preventive pigment is coated on a base material face and then an adhesive containing no rust preventive pigment is coated thereon, followed by heating and pressing the film (for example, Japanese Patent Application Laid-Open No. 64125/1994). Involved in this method, however, are the defects that the number of the steps is increased and that a rust preventive pigment contained in an undercoating film is liable to bring about a reduction in finish appearance such as flatness.

On the other hand, a coating step of a shell plate part of a car is carried out by molding, working and assembling a metal plate, immersing it in a cationically electrodepositable coating material bath and applying an electric current to form undercoating films on both front and back sides and end face parts thereof and then coating an intermediate coating material and a top coating material primarily on the outer face parts. In recent years, however, step saving, energy cutting and a reduction in $CO_2$ in a coating line are strongly required, and in addition thereto, performances such as a throwing property of an electrodepositable coating material toward an end face part and a chipping resistance and a corrosion resistance of a combined coating film are requested to be further improved.

Intensive researches repeated by the present inventors in order to solve such problems as described above in conventional techniques have resulted in finding that a mixture comprising an amine-added epoxy resin (A) and a polyisocyanate compound (B) is used as an adhesive to stick a plastic film on a metal face via a coating film of this adhesive, whereby obtained is a plastic-coated metal plate which is excellent in an adhesive property and a corrosion resistance and which is useful for a car body, and they have come to complete the present invention.

Thus, the present invention provides a plastic-coated metal plate prepared by adhering a plastic film at least to one face of a metal plate via a thermosetting adhesive comprising an amine-added epoxy resin (A) and a polyisocyanate compound (B).

The plastic-coated metal plate of the present invention shall be explained below in further details.

Amine-added Epoxy Resin (A)

The amine-added epoxy resin (A) which is one component of the thermosetting adhesive used in the present invention is a polyester-modified epoxy resin, preferably polyester-modified epoxy resin (A') obtained by reacting a poly addition reaction product of a hydroxyl group-containing epoxy resin having an epoxy equivalent of 200 to 400 (a) with a cyclic ester (b), a polyphenol compound (c) and an amino group-containing compound (d) in order of mention.

The hydroxyl group-containing epoxy resin (a) is a resin having both hydroxyl group and epoxy group in a molecule, and to be specific, it is preferably a resin having a hydroxyl group, preferably a secondary hydroxyl group of at least 0.5 group, preferably 0.8 to less than 2 groups per molecule on an average and an epoxy group of 2 or more groups, preferably 2 groups on an average. The hydroxyl group-containing epoxy resin (a) has preferably an epoxy equivalent falling in a range of 200 to 400, particularly 230 to 350 and a number average molecular weight falling in a range of about 400 to about 1000, particularly about 450 to about 700.

Polyglycidyl ethers of polyphenol such as bisphenol are included in such hydroxyl group-containing epoxy resin (a). Representative examples of such epoxy resin include glycidyl ethers of polyphenol such as bis(4-hydroxyphenyl)-2,2-propane, bis(4-hydroxyphenyl)-1,1-ethane, bis(4-hydroxyphenyl)methane, 4,4'-dihydroxydiphenylsulfone, phenol novolak and cresol novolak, and polymers thereof. Further, these epoxy resins (a) may be modified with, for example, polyetherpolyol, polyesterpolyol, polyamideamine, polycarboxylic acid and polyisocyanate compounds each having a softening point falling in a range of −30 to 50° C., particularly −20 to 40° C.

Included in the cyclic ester (b) is a lactone compound represented by the following formula:

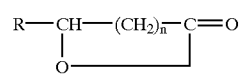

wherein R represents a hydrogen atom or methyl, and n is 3 to 6. To be specific, included are δ-valerolactone, ε-caprolactone, ζ-enalactone, η-caprylolactone, γ-valerolactone, δ-caprolactone, ε-enalactone and ζ-caprylolactone.

The cyclic ester (b) is addition-reacted with the hydroxyl group-containing epoxy resin (a) described above to produce the poly addition reaction product (c).

This poly addition reaction can be carried out by conventionally known methods. It can be carried out, for example, by heating both components (a) and (b) at a temperature of about 100 to about 250° C., preferably about 140 to about 220° C. for about one to about 15 hours in the presence of a catalyst, wherein used as the catalyst are, for example, titanium compounds such as tetrabutoxytitanium and tetrapropoxytitanium; organic tin compounds such as tin octylate, dibutyltin oxide and dibutyltin laurate; and inorganic metal compounds such as stannous chloride. A use amount of the above catalyst falls suitably in a range of usually 0.5 to 1000 ppm based on the total weight of both components.

It is assumed that the addition reaction of both components described above is carried out by allowing the cyclic ester (b) to be opened and reacted with a secondary hydroxyl group contained in the epoxy resin (a). It is considered that as a result thereof, a side chain with a large plasticizing capacity having a primary hydroxyl group having an excellent reactivity is introduced into the poly addition reaction product, so that an adhesive-coating film formed is improved in a corrosion resistance, an adhesive property and a finishing property.

A use amount of the cyclic ester (b) shall not strictly be restricted and is preferably controlled so that a moiety originating in the cyclic ester (b) in the modified epoxy resin (A') which is the final reaction product has a content falling usually in a range of 5 to 40% by weight, particularly 10 to 35% by weight.

Next, the poly addition reaction product thus obtained is reacted with the polyphenol compound (c) and the amino group-containing compound (d), whereby obtained is the modified epoxy resin (A') containing a hydroxyl group and an amino group.

A reaction order of the poly addition reaction product with the polyphenol compound (c) and the amino group-containing compound (d) shall not specifically be restricted, and they can be reacted at the same time or in order. In general, in order to narrow a molecular weight distribution of the modified epoxy resin (A'), the poly addition reaction product is reacted with the polyphenol compound (c) and then the amino group-containing compound (d).

Capable of being used as the polyphenol compound (c) are, for example, bis(4-hydroxyphenyl)-2,2-propane, bis(4-hydroxyphenyl)-1,1-ethane, bis(4-hydroxyphenyl)-1,1-isobutane, 4,4'-dihydroxybenzophenone, bis(4-hydroxy-3-t-butylphenyl)-2,2-propane, bis(2-hydroxynaphthyl)-methane and 1,5-dihydroxynaphthalene, and bis(4-hydroxyphenyl)-2,2-propane ("bisphenol A" in a general term) is particularly suited.

The polyphenol compound (c) can be reacted directly with the poly addition reaction product or a product obtained by reacting the poly addition reaction product with the amino group-containing compound (d). The reaction thereof can be carried out by conventionally known methods. It can be carried out, for example, by heating them at a temperature of about 50 to about 200° C., preferably about 80 to about 160° C. for about one to about 15 hours in the presence of a catalyst, wherein used as the catalyst is, for example, a base amino compound such as dimethylbenzylamine, tributylamine and triethylamine. Usually, a use amount of the above catalyst falls suitably in a range of 1 to 2000 ppm based on the total amount of the poly addition reaction product and the polyphenol compound (c). The polyphenol compound (c) is introduced into the poly addition reaction product or the reaction product of the poly addition reaction product with the amino group-containing compound (d) by this reaction, and a secondary hydroxyl group which contributes to an improvement in an adhesive property of the coating film is formed.

A use amount of the polyphenol compound (c) in this reaction shall not strictly be restricted and falls preferably in a range of usually 0.2 to 0.9 mole, particularly 0.35 to 0.75 mole per mole of the poly addition reaction product or the reaction product of the poly addition reaction product with the amino group-containing compound (d).

The amino group-containing compound (d) can be reacted directly with the poly addition reaction product or a product obtained by reacting the poly addition reaction product with the polyphenol compound (c).

The amino group-containing compound (d) may be any compound as long as it can be reacted with an epoxy group of the poly addition reaction product to introduce a secondary amino group or a tertiary amino group, and it includes, for example, aliphatic, alicyclic and aromatic-aliphatic, particularly aliphatic primary or secondary amines (they are reacted with an epoxy group to introduce an amino group into an epoxy resin); and tertiary aminomonoisocyanates obtained by reacting tertiary aminoalcohol with diisocyanate (they can be reacted with a hydroxyl group contained in an epoxy resin to introduce an amino group into the above epoxy resin).

The primary or secondary amines include the following compounds which are given as examples thereof:

1) primary monoamines including alkylamines such as methylamine, ethylamine and n- or iso-propylamine and alkanolamines such as monoethanolamine and n- or iso-propanolamine;

2) secondary monoamines including dialkylamines such as diethylamine; dialkanolamines such as diethanolamine and di-n- or iso-propanolamine; and N-alkanolalkylamines such as N-methylethanolamine and N-ethylethanolamine;

3) primary or secondary polyamines such as ethylenediamine, diethylenetriamine, hydroxyethylaminoethylamine, ethylaminoethylamine, methylaminopropylamine, dimethylaminoethylamine and dimethylaminopropylamine.

Among them, dialkylamines and dialkanolamines are particularly suited.

These primary or secondary amines can be reacted with an epoxy group of the poly addition reaction product or an epoxy group of the reaction product of the poly addition reaction product with the polyphenol compound (c), for example, on the conditions of a temperature of about 30 to about 150° C., preferably about 50 to about 120° C. and one to 3 hours. In general, when primary amines and N-hydroxyalkyl-sec-amines among the amino group-containing compounds (d) are used, these compounds are reacted in advance with ketones, aldehydes or carboxylic acids, for example, by heating and reacting them at a temperature of about 100 to about 230° C. to modify them to aldimines, ketimines, oxazolines or imidazolines, and they are reacted preferably with an epoxy group of the poly addition reaction product or an epoxy group of the reaction product of the poly addition reaction product with the polyphenol compound (c), for example, at a temperature of about 80 to about 200° C., preferably about 100 to about 150° C. for 2 to 5 hours.

When used as the amino group-containing compound (d) are tertiary aminomonoisocyanates obtained by reacting tertiary aminoalcohols (for example, dimethylaminoalcohol, diethylaminoalcohol and the like) with diisocyanates (for example, isophoronediisocyanate and the like) in an OH/NCO equimolar ratio, they are preferably reacted with an epoxy group of the poly addition reaction product or an epoxy group of the reaction product of the poly addition reaction product with the polyphenol compound (c), for example, at a temperature of about 30 to about 150° C., particularly about 50 to about 120° C. until absorption of an isocyanate group is not detected by measurement of an infrared spectrum.

A use amount of these amino group-containing compounds (d) stays preferably in such an extent that the resulting modified epoxy resin (A') has an amine value falling usually in a range of 15 to 100, particularly 30 to 80. The resulting modified epoxy resin (A') has preferably a number average molecular weight falling usually in a range of about 1000 to about 7000, particularly about 2000 to about 5000.

Polyisocyanate Compound (B)

The polyisocyanate compound (B) blended with the thermosetting adhesive in the present invention functions as a cross-linking agent for the modified epoxy resin (A') described above. To be specific, capable of being used are polyisocyanate compounds having two or more free isocyanate groups which are not blocked in a molecule and blocked polyisocyanate compounds obtained by blocking the isocyanate groups of these polyisocyanate compounds with a blocking agent.

The polyisocyanate compounds include, for example, aromatic diisocyanates such as tolylenediisocyanate, diphenylmetanediisocyanate, xylylenediisocyanate and naphthalenediisocyanate; aliphatic diisocyanates such as tetramethylenediisocyanate, hexamethylenediisocyanate, dimeric acid diisocyanate and lysine diisocyanate; alicyclic diisocyanates such as methylenebis-(cyclohexylisocyanate), isophoronediisocyanate, methylcyclohexanediisocyanate, cyclohexanediisocyanate and cyclopentanediisocyanate; buret type adducts and isocyanuric ring type adducts of the above polyisocyanate compounds; and free isocyanate group-containing prepolymers obtained by reacting these polyisocyanate compounds with low molecular weight or high molecular weight polyols in an excess of the isocyanate groups. Among them, the aliphatic or alicyclic diisocyanates are suited.

The blocked polyisocyanate compound is a compound obtained by blocking substantially all isocyanate groups of the polyisocyanate compound described above with a blocking agent. Capable of being used as the blocking agent are, for example, conventionally known blocking agents such as phenols, oximes, lactams, active methylenes, alcohols, acid amides, imides, amines, imidazoles, ureas, carbamic acids, imines and mercaptans. The blocked isocyanate groups are stable at a room temperature, but heating them at a dissociation temperature or higher allows the blocking agent to dissociate, and the isocyanate groups are reproduced and easily subjected to cross-linking reaction with the amine-added epoxy resin (A).

The polyisocyanate compound (B) used in the present invention has preferably a number average molecular weight falling usually in a range of 200 to 10000, particularly 400 to 3000.

In the thermosetting adhesive used in the present invention, particularly preferably used as the polyisocyanate compound (B) is a mixture of a polyisocyanate compound (B-1) having free isocyanate groups which are not blocked and a blocked polyisocyanate compound (B-2) having blocked isocyanate groups. A proportion of these both components in the mixture system shall not specifically be restricted. The polyisocyanate compound (B-1) falls suitably in a range of 1 to 99% by weight, particularly 30 to 90% by weight, and the blocked polyisocyanate compound (B-2) falls suitably in a range of 99 to 1% by weight, particularly 70 to 10% by weight each based on the total solid matter weight of both components.

Thermosetting Adhesive

The thermosetting adhesive used in the present invention comprises the amine-added epoxy resin (A) and the polyisocyanate compound (B) each described above, and a blend proportion of these compounds falls suitably in a range of 50 to 90% by weight, particularly 60 to 80% by weight in the case of the amine-added epoxy resin (A) and falls suitably in a range of 50 to 10% by weight, particularly 40 to 20% by weight in the case of the polyisocyanate compound (B) each based on the total solid matter weight of these both components.

The thermosetting adhesive used in the present invention comprises, for example, the amine-added epoxy resin (A) and the polyisocyanate compound (B) each described above as essential components and can suitably be blended, if necessary, with an organic solvent, a color pigment, a rust-preventive pigment, an extender pigment, a curing catalyst (for example, dibutyltin benzoate) and a settling preventive (for example, a surfactant).

In particular, when this thermosetting adhesive is used as an adhesive in coating a plastic layer on a metal plate, obtained is a plastic-coated metal plate which can suitably be used for a car body and which is excellent in an adhesive property and a corrosion resistance.

Preparation of Plastic-coated Metal Plate

Those which have so far been used for a shell plate part of a car body can similarly be used as a metal plate for forming a plastic layer thereon, and materials therefor include, for example, metal plates of iron, steel, stainless steel, zinc, aluminum, copper and alloys containing these metals, and metal plates obtained by plating the surfaces of these metals with zinc, zinc/nickel and iron, and they can be used by working into the form of a coil or a cut plate. The metal plates have suitably a thickness falling in a range of usually 0.3 to 2.0 mm, particularly 0.5 to 1.0 mm. The surfaces of these metal plates are preferably subjected in advance to suitable polishing treatment, degreasing treatment and phosphate treatment in order to elevate an adhesive property with a plastic layer and a corrosion resistance.

In particular, the phosphate treatment can be carried out, for example, by dipping a metal plate in an aqueous solution or a water dispersion containing metal salts such as iron phosphate, manganese phosphate and zinc phosphate, and zinc phosphate blended with ions of calcium, nickel and magnesium or spraying it on the metal plate, washing it if necessary and drying it at a room temperature or by heating.

The thermosetting adhesive described above is coated on a part to be coated with a plastic layer on one face or both faces of this metal plate. This can be coated by conventionally known methods. They include, for example, spray coating, roller coating and dip coating. The adhesive composition to be coated has preferably a temperature falling in a range of about 10 to about 70° C., particularly about 15 to about 50° C. After coating, the coating film thereof can be cured by leaving standing at a room temperature or heating. The coating film of the adhesive has preferably a thickness falling in a range of usually 1 to 20 $\mu$m, particularly 3 to 15 $\mu$m.

The plastic-coated metal plate according to the present invention can be obtained by coating the thermosetting adhesive on a prescribed surface of the metal plate, curing it and then coating the adhesive face thereof with a plastic layer.

Capable of being used as plastics materials for coating the metal plates are, for example, conventionally known thermoplastic resins or thermosetting resins including polyolefin resins such as polyethylene and polypropylene, polyester resins such as polyethylene terephthalate (PET), polycarbonate resins, epoxy resins, vinyl acetate resins, vinyl chloride resins, fluorine-containing resins, polyvinyl acetal resins, polyvinyl alcohol resins, polyamide resins, polystyrene resins, acryl resins, polyurethane resins, phenol resins and polyether resins. These resins may contain, if necessary, color pigments and extender pigments.

The metal plate can be coated with these plastic materials by conventionally known methods. It can be coated, for example, by such methods that a film-shaped or sheet-shaped plastic material molded by extrusion molding, injection molding, calendar molding and compression molding is stuck on a metal plate; a plastic material molten by heating is extruded into a film or sheet, and it is adhered on a metal plate by pressing; and a powdery plastic material is adhered on a metal plate by fluidized dipping or electrostatic coating and molten by heating to form a plastic layer.

When the plastic-coated metal plate of the present invention is used for a car body, a plastic layer is coated on the surface of a metal plate positioned at least on the outside surface of the car body and can be coated, if necessary, on the other parts, for example, a back surface side. The coated plastic layers have a thickness falling suitably in a range of usually 1 to 100 $\mu$m, particularly 5 to 50 $\mu$m. Further, these plastic layers are preferably subjected on the plastic layer surfaces to treatment such as corona discharge treatment, plasma treatment and flame treatment before or after coated on the metal plate.

The plastic-coated metal plate obtained in the manner described above according to the present invention can be applied to the shell plate parts of metal-made products such as car bodies, electric appliances and business equipments.

In particular, the plastic-coated metal plate according to the present invention is excellent in a corrosion resistance and an adhesive property and scarcely causes peeling and lifting of a plastic layer and a blistering phenomenon by blister even after a long period of time is passed. In addition thereto, the plastic layer is not peeled off even if stones strike strongly against it, and therefore the plastic-coated metal plate is preferably applied for forming car bodies to which such performance is requested.

In using the plastic-coated metal plate according to the present invention to form a car body, the metal plate coated on both faces or one face thereof with the plastic layer in such manner as described above can be used.

For example, the plastic-coated metal plate obtained in such manner as described above is cut, molded and joined to prepare car parts for main outer face parts of a car body, and capable of being formed are a "main body" composed of an underbody, a side member, a roof, a cowl, an upper back and a lower back and/or an "outer covered part" such as a hood, a front balance, a front fender, a cowl louver, doors and a luggage (back doors).

To be specific, the "main body" is composed mainly of an underbody, a side member, a roof, a cowl, an upper back and a lower back. The underbody means floor parts for a passenger compartment (cabin) and a luggage boot and is a general term for a front underbody, a front floor and a rear floor. The side member is to combine with a front body, a roof panel and an underbody to form a side face of a cabin and prevent bending and torsion of the vehicle. The cowl is a panel for connecting longitudinal and lateral pillars. The upper back is a panel for connecting right and left quarter panels (rear fenders) at a rear part of a car body to form an outside face of the car body.

All or a part of these parts can be produced by using the plastic-coated metal plate according to the present invention. For example, the plastic-coated metal plate of the present invention is cut into an intended shape and size and molded by pressing by a conventionally known method by means of a press working machine to produce the "main body". The main body molded in such a manner as described above is coated at least on the outside thereof with the plastic layer, and the end face part and back side of the cut coated metal plate remain uncoated, but the end face part may be coated as well with the plastic layer.

The "outer covered part" is composed mainly of a hood, a front balance, a front fender, a cowl louver, doors and a luggage (back doors), and in order to form these respective parts, the plastic-coated metal plate according to the present invention is cut into an intended shape and size and molded by pressing by a conventionally known method, followed by combining them by an adhesive, welding and bolting to thereby form the "outer covered part". The outer covered part thus obtained is coated at least on the outside thereof with the plastic layer, and the cut metal plate remains uncoated on the end face part and, in a certain case, the back side thereof, so that the metal is exposed, but the back side thereof may be coated with the plastic layer.

The "shell body" can be formed by combining the "main body" with the "outer covered part" which are produced in such a manner as described above by using the plastic-coated metal plate according to the present invention.

Only the outer covered part can be formed from the plastic-coated metal plate according to the present invention, and this can be mounted on a main body produced by a conventional method, whereby the shell body can be formed.

Metal is sometimes exposed in the end face part and, in a certain case, the back face part of the shell body produced in such a manner as described above, and therefore in order to elevate a corrosion resistance in these parts, they are preferably immersed in, for example, a electrodepositable coating material bath and apply an electric current to electrodepositably coat these parts, whereby an undercoating film is formed thereon. A conventionally known electrodepositable coating material of either an anionic type or a cationic type can be used as electrodepositable coating material and usually, a cationic type electrodepositable coating material which forms a coating film having a good corrosion resistance is preferably used. Further, an intermediate coating material and a top coating material can be coated, if necessary, on the surface of the plastic layer in an outside part of the shell body.

Effects and advantages described below can be obtained according to the plastic-coated metal plate of the present invention prepared by using the thermosetting adhesive described above:

1) The modified epoxy resin (A') formed using the epoxy resin (a) is excellent in an acid resistance, an alkali resistance and an adhesive property to a metal face, and it is excellent as well in a corrosion resistance by virtue of a base effect attributable to the amino group-containing compound (e).

2) A side chain with a large plasticizing capacity having a primary hydroxyl group having an excellent reactivity is introduced into the modified epoxy resin (A') by adding the cyclic ester compound (b), so that baking at a low temperature of 180° C. or lower and coating of a thick film become possible, and a coating film which is excellent in an adhesive property, a flexibility and a corrosion resistance can be formed.

3) The adhesive according to the present invention makes it possible to coat a thick film (10 μm or less in the case of conventional adhesives), and therefor the coating film has a good smoothness.

The present invention shall more specifically be explained below with reference to examples. Parts and percentage are based on weight, and a thickness of a coating film is expressed in terms of a cured coating film.

1. PRODUCTION EXAMPLES

Thermosetting Adhesive (a)

A flask equipped with a stirrer, a thermometer, a nitrogen-introducing tube and a reflux condenser was charged with 518 parts of an epoxy resin having a number average molecular weight of 370 and an epoxy equivalent of 185 which was obtained by reacting bisphenol A with epichlorohydrin, and 57 parts of bisphenol A and 0.2 part of dimethylbenzylamine were added to react them at 120° C. until the epoxy equivalent reached 250 to obtain a hydroxyl group-containing epoxy resin (a). Then, added thereto were 213 parts of ε-caprolactone (b) and 0.03 part of tetrabutoxytitanium, and the temperature was elevated up to 170° C. Sampling was carried out with the passage of time while maintaining the same temperature to measure the amount of unreacted ε-caprolactone by measuring an infrared absorption spectrum, and the addition reaction was carried out until the reaction rate reached 98% or more to obtain a poly addition reaction product. Added thereto were 148 parts of bisphenol A (c) and 0.4 part of dimethylbenzylamine to react them at 130° C. until the epoxy equivalent reached 936. Then, further added were 257.4 parts of methyl isobutyl ketone, 25.6 parts of diethylamine (d) and 68.3 parts of diethanolamine (d) to react them at 80° C. for 2 hours, and then the solution was diluted with 143.4 parts of methyl isobutyl ketone to thereby obtain a modified epoxy resin vernish (A') having a resin solid content of 73% and an amino value (resin solid matter) of 54.5.

Mixed and stirred were 102.7 parts (solid content: 73%) of this modified epoxy resin vernish (A') and 25 parts of "Duranate TPA-100" (trade name: polyisocyanate compound of a hexamethylenediisocyanate base, manufactured by Asahi Chemicals Ind. Co., Ltd.) (B), and further mixed and dispersed in methyl ethyl ketone was 2.5 parts of dibutyltin benzoate (trade name: "LSN-105", solid matter content: 40%, manufactured by Sankyo Yuki Gosei Co., Ltd.) to obtain a thermosetting adhesive (a) solution having a solid matter content of 40%.

Thermosetting Adhesive (b)

Mixed and stirred were 102.7 parts (solid matter content: 73%) of the modified epoxy resin vernish (A') obtained in the production example described above, 12.5 parts of "Duranate TPA-100" and 13.9 parts (solid matter content: 90%) of "Duranate TPA-100" in which all isocyanate groups were blocked with methylethylketoxime, and further added was 2.5 parts of dibutyltin benzoate ("LSN-105") and mixed and dispersed in methyl ethyl ketone to obtain a thermosetting adhesive (b) solution having a solid matter content of 40%.

Thermosetting Adhesive (c)

An adhesive solution having a solid matter content of 30% prepared by mixing and dispersing 90 parts of "Elitel UE3200" (trade name: polyester resin, manufactured by Unitica Co., Ltd.) and 10 parts of "Duranate TPA-100" in a mixed solvent (methyl ethyl ketone/toluene=50/50 weight ratio).

2. EXAMPLES AND COMPARATIVE EXAMPLES

Example 1

Both faces of a polyester film (trade name: "Ester Film E5100", thickness: 16 μm, manufactured by Toyobo Co., Ltd.) were subjected to corona discharge treatment, and the thermosetting adhesive (a) obtained in the production example was coated to a film thickness of 7 μm on one face thereof, followed by drying it by heating at 120° C. for 30 seconds and rolling it up. An alloying hot-dipping steel plate having a thickness of 0.8 mm and a plating amount of 45 g/m² (plated on both sides) was subjected to degreasing treatment, and the polyester film described above was stuck on one face thereof so that the coated face of the thermosetting adhesive (a) was brought into contact therewith to be hot-pressed and heated at 170° C. for 20 minutes, whereby a plastic-coated metal plate for a car body was obtained.

Example 2

A plastic-coated metal plate for a car body was obtained in the same manner as in Example 1, except that a degreased cold-rolled steel plate having a thickness of 0.8 mm was substituted for the alloying hot-dipping steel plate used in Example 1.

Example 3

A plastic-coated metal plate for a car body was obtained in the same manner as in Example 2, except that the film thickness of the thermosetting adhesive (a) used in Example 2 was changed to 12 μm.

Example 4

Both faces of the polyester film (trade name: "Ester Film E5100", thickness: 16 μm, manufactured by Toyobo Co., Ltd.) were subjected to corona discharge treatment, and the thermosetting adhesive (b) obtained in the production example was coated to a film thickness of 12 μm on one face thereof, followed by drying it by heating at 120° C. for 30 seconds and rolling it up. The polyester film described above was stuck on one face of a degreased cold-rolled steel plate having a thickness of 0.8 mm so that the coated face of the thermosetting adhesive (b) was brought into contact therewith to be hot-pressed and heated at 170° C. for 20 minutes, whereby a plastic-coated metal plate for a car body was obtained.

Comparative Example 1

A plastic-coated metal plate for a car body was obtained in the same manner as in Example 1, except that the thermosetting adhesive (c) was substituted for the thermosetting adhesive (a) used in Example 1.

Comparative Example 2

A plastic-coated metal plate for a car body was obtained in the same manner as in Example 1, except that the thermosetting adhesive (c) was substituted for the thermosetting adhesive (a) used in Example 2.

3. PERFORMANCE TEST RESULT

The plastic-coated metal plates obtained in Examples 1 to 4 and Comparative Examples 1 to 2 were subjected to various performance tests. The results thereof are shown in Table 1.

TABLE 1

|  | Example | | | | Comparative Example | |
| --- | --- | --- | --- | --- | --- | --- |
|  | 1 | 2 | 3 | 4 | 1 | 2 |
| Impact test | ○ | ○ | ○ | ○ | ○ | ○ |
| Bending test | ○ | ○ | ○ | ○ | ○ | ○ |
| Corrosion resistance | ⊚ | ○ | ⊚ | ○ | Δ | X |
| Sharpness | ○ | ○ | ⊚ | ⊚ | Δ | Δ |

The performance tests were carried out by the following methods.

Du Pont System Impact Test:

A weight having a load of 500 g was fallen on a film surface on conditions of ½ inch and a height of 50 cm in an environment of 20° C., and then an adhesive cellophane tape was stuck on the part thereof. It was quickly peeled off to observe a peeling state of the coating film on the impacted part and evaluate it according to the following criteria:

○: peeling of coating film not observed at all and good

Δ: a little peeling of coating film observed and slightly inferior

X: a lot of peeling of coating film observed and inferior

Bending Test:

A film which was cut by means of a cutter knife so that it reached the base was bent by 180° for about one second using a pillar of 10 mmϕ as a supporting point with the cut film surface being turned to an outside, and then an adhesive cellophane tape was stuck on the part thereof. It was quickly peeled off to observe a peeling state of the coating film on the bent part and evaluate it according to the following criteria:

○: peeling of coating film not observed at all and good

Δ: a little peeling of coating film observed and slightly inferior

X: a lot of peeling of coating film observed and inferior

Corrosion Resistance:

A film was cross-cut by means of a cutter knife so that it reached the base and subjected to a brine-spray test for 480 hours according to JIS Z-237, and then a width of rust and blister produced in the cut part was observed and evaluated according to the following criteria:

⊚: maximum width of rust and blister produced was less than 1 mm (one side) from cut part ○: width of rust and blister produced was 1 mm or more and less than 2 mm (one side) from cut part Δ: width of rust and blister produced was 2 mm or more and less than 3 mm (one side) from cut part X: width of rust and blister produced was 3 mm or more (one side) from cut part, and blister was observed to be produced on the whole surface Sharpness:

A top coating material "Ruga Bake QMI White" (trade name: aminoalkid resin base white top coating material, manufactured by Kansai Paint Co., Ltd.) was coated on a plastic film surface so that the film thickness became 40 μm, and it was cured by heating at 140° C. for 30 minutes to measure a sharpness of the top coating film by means of an image clarity-measuring equipment (manufactured by Suga Tester Co., Ltd.) and evaluate it according to the following criteria:

⊚: measured value was 80 or more

○: measured value was 75 or more and less than 80

Δ: measured value was 70 or more and less than 75

X: measured value was less than 70

What is claimed is:

1. A plastic-coated metal plate prepared by adhering a pre-formed plastic film at least to one face of a metal plate with a thermosetting adhesive comprising an amine-added epoxy resin (A) wherein the amine-added epoxy resin (A) is a polyester-modified epoxy resin obtained by reacting a hydroxyl group-containing epoxy resin (a) having an epoxy equivalent of 200 to 400 with a cyclic ester (b), a polyphenol compound (c) and an amino group-containing (d) in order of mention and a polyisocyanate compound (B).

2. The plastic-coated metal plate as described in claim 1, wherein the amine-added epoxy resin (A) is a polyester-modified epoxy resin.

3. The plastic-coated metal plate as described in claim 2, wherein the hydroxyl group-containing epoxy resin (a) contains a hydroxyl group of 0.8 to less than 2 groups per molecule on an average and has an epoxy equivalent falling in a range of 200 to 400 and a number average molecular weight falling in a range of 400 to 1000.

4. The plastic-coated metal plate as described in claim 2, wherein the cyclic ester (b) is a lactone compound represented by a formula:

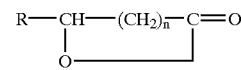

wherein R represents a hydrogen atom or methyl, and n is 3 to 6.

5. The plastic-coated metal plate as described in claim 2, wherein the polyphenol compound (c) is selected from the group consisting of bis(4-hydroxyphenyl)-2,2-propane, bis(4-hydroxyphenyl)-1,1-ethane, bis(4-hydroxyphenyl)-1,1-isobutane, 4,4'-dihydroxybenzophenone, bis(4-hydroxy-3-t-butylphenyl)-2,2-propane, bis(2-hydroxynaphthyl)-methane and 1,5-dihydroxynaphthalene.

6. The plastic-coated metal plate as described in claim 2, wherein the amino group-containing compound (d) is an aliphatic primary or secondary amine or a tertiary aminomonoisocyanate.

7. The plastic-coated metal plate as described in claim 2, wherein the modified epoxy resin contains a moiety originating in the cyclic ester (b) in a proportion falling in a range of 5 to 40% by weight.

8. The plastic-coated metal plate as described in claim 2, wherein the modified epoxy resin has an amine value falling in a range of 15 to 100.

9. The plastic-coated metal plate as described in claim 2, wherein the modified epoxy resin has a number average molecular weight falling in a range of about 1000 to about 7000.

10. The plastic-coated metal plate as described in claim 1, wherein the polyisocyanate compound (B) is an aliphatic or alicyclic diisocyanate.

11. The plastic-coated metal plate as described in claim 1, wherein the polyisocyanate compound (B) has a number average molecular weight falling in a range of about 200 to about 10000.

12. The plastic-coated metal plate as described in claim 1, wherein the polyisocyanate compound (B) is a mixture of a non-blocked polyisocyanate compound and a blocked polyisocyanate compound.

13. The plastic-coated metal plate as described in claim 11, wherein the polyisocyanate compound (B) is a mixture of 30 to 90% by weight of the non-blocked polyisocyanate compound and 70 to 10% by weight of the blocked polyisocyanate compound.

14. The plastic-coated metal plate as described in claim 1, wherein the thermosetting adhesive comprises 50 to 90% by weight of the amine-added epoxy resin (A) and 50 to 10% by weight of the polyisocyanate compound (B) each based on the total solid matter weight of both components.

15. The plastic-coated metal plate as described in claim 1, wherein the coating film of the thermosetting adhesive has a thickness of 1 to 20 $\mu$m.

16. A car body formed from the plastic-coated metal plate as described in claim 1.

17. A process for the production of a plastic-coated metal plate according to claim 1 which comprises applying a thermosetting adhesive to one face of plastic film or sheet, adhering thus prepared plastic film or sheet to one or both faces of a metal plate via thus formed adhesive layer, and subsequently heating the adhesive layer.

* * * * *